(12) United States Patent
Staffelbach et al.

(10) Patent No.: US 11,061,739 B2
(45) Date of Patent: Jul. 13, 2021

(54) DYNAMIC INFRASTRUCTURE MANAGEMENT AND PROCESSING

(71) Applicant: International Business Machines Corporation, Armonk, NY (US)

(72) Inventors: Matthew Staffelbach, White Plains, NY (US); Ameya Tayade, White Plains, NY (US); Alexei Karve, Mohegan Lake, NY (US); Neeraj Asthana, Acton, MA (US); Thomas E. Chefalas, Somers, NY (US); Alla Segal, Mount Krisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 16/381,603

(22) Filed: Apr. 11, 2019

(65) Prior Publication Data

US 2020/0326990 A1    Oct. 15, 2020

(51) Int. Cl.
| | |
|---|---|
| *G06F 9/50* | (2006.01) |
| *G06F 9/455* | (2018.01) |
| *G06F 8/41* | (2018.01) |
| *G06F 8/60* | (2018.01) |
| *G06N 5/02* | (2006.01) |

(52) U.S. Cl.
CPC .............. *G06F 9/5077* (2013.01); *G06F 8/42* (2013.01); *G06F 8/60* (2013.01); *G06F 9/45558* (2013.01); *G06N 5/022* (2013.01)

(58) Field of Classification Search
CPC .......... G06F 5/022; G06F 8/60; G06F 9/5077; G06F 8/42; G06F 9/45558
See application file for complete search history.

(56) References Cited

U.S. PATENT DOCUMENTS

| | | | |
|---|---|---|---|
| 7,127,712 B1 | 10/2006 | Noble et al. | |
| 8,448,170 B2 | 5/2013 | Wipfel et al. | |
| 8,627,309 B2 | 1/2014 | Scheidel et al. | |
| 9,357,034 B2 | 5/2016 | Kumar et al. | |
| 2003/0065810 A1* | 4/2003 | Ims | H04L 67/2842 709/232 |
| 2007/0100936 A1* | 5/2007 | Lum | H04L 67/34 709/203 |
| 2009/0113397 A1* | 4/2009 | Wright, Sr. | G06F 21/552 717/127 |

(Continued)

OTHER PUBLICATIONS

Kim, Hyukho, et al., A Patterns-Based Prediction Model for Dynamic Resource Provisioning in Cloud Environment, KSII Transactions on Internet and Information Systems, vol. 5, No. 10, Oct. 2011, pp. 1712-1732.

*Primary Examiner* — Tuan C Dao
(74) *Attorney, Agent, or Firm* — Lieberman & Brandsdorfer, LLC

(57) ABSTRACT

A system, computer program product, and method are provided to automate management of a computer architecture as represented in a codified infrastructure with one or more embedded dynamically labeled resources. The codified infrastructure is subject to interpretation within the context of the dynamically labeled resources. The dynamic labels are converted to static labels, after which the corresponding architecture is deployed. The deployment architecture continues to be updated when the meaning of the dynamic labels change.

20 Claims, 11 Drawing Sheets

(56) References Cited

U.S. PATENT DOCUMENTS

| | | |
|---|---|---|
| 2010/0115490 A1 | 5/2010 | Wilcock et al. |
| 2015/0310362 A1* | 10/2015 | Huffman ............ G06Q 10/0633 |
| | | 705/2 |
| 2015/0378716 A1 | 12/2015 | Singh et al. |
| 2016/0048388 A1 | 2/2016 | Eksten et al. |
| 2017/0004018 A1 | 1/2017 | Mangtani et al. |
| 2017/0250867 A1* | 8/2017 | Kohli .................. H04L 41/0813 |
| 2017/0372062 A1 | 12/2017 | Eksten et al. |
| 2018/0109438 A1* | 4/2018 | Varki .................... H04L 45/122 |
| 2019/0138318 A1* | 5/2019 | Yang ........................ G06F 8/35 |

* cited by examiner

| 120 — Resource Type | resource "computing_platform:virtual_machine" { |
|---|---|
| 130 — Name of Resource | name = "my_server_1" |
| 140 — Resource Properties | domain = "example.com"<br>ssh_keys = ["123456"]<br>image = "DEBIAN_7_64"<br>region = "ams01"<br>public_network_speed = 10<br>cpu = 2<br>ram = 4096 |

110

| 160 — Resource Type | }<br>resource "Database"<br>{ |
|---|---|
| 170 — Name of Resource | name = "my_database_1" |
| 180 — Resource Properties | db_instance = "inventory" |
| 190 — Dependency | target =<br>    $("my_server_1")<br>} |

DYNAMIC INFRASTRUCTURE
MANAGEMENT AND PROCESSING

BACKGROUND

The present embodiment(s) relate to codified infrastructures representing computer architectures. More specifically, the embodiment(s) relate to an intelligent platform to enhance and support dynamic architecture management by embedding one or more dynamic labels in the codified infrastructure(s) and dynamically reflecting one or more labels values and changes of the values in a corresponding launched architecture.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificially intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. More specifically, ML is the application of AI through creation of neural networks that can demonstrate learning behavior by performing tasks that are not explicitly programmed. Deep learning is a type of ML in which systems can accomplish complex tasks by using multiple layers of choices based on output of a previous layer, creating increasingly smarter and more abstract conclusions.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

SUMMARY

The embodiments include a system, computer program product, and method for dynamic infrastructure management and processing, including embedding and encoding one or more dynamic labels within the infrastructure, and subjecting a corresponding launched architecture to dynamic management responsive to changes to the label content and context.

In one aspect, a computer system is provided with a processing unit operatively coupled to a memory, and a knowledge engine operatively coupled to the processing unit and memory. The knowledge engine is configured with tools in the form of a manager, an interpreter, and a director configured with functionality to interpret and manage a codified infrastructure. The manager is configured to receive a codified infrastructure that has one or more embedded dynamically labeled resources. The meaning of each dynamic label is subject to change based on time and context. The interpreter, which is operatively coupled to the manager, functions to convert each dynamic label to zero or more static labels, and effectively generate a statically labeled codified infrastructure. The director reads the statically labeled codified infrastructure, and constructs the architecture as described in the codified infrastructure.

In another aspect, a computer program product is provided to process textual data. The computer program product is provided with a computer readable storage device having embodied program code. The program code is executable by the processing unit with functionality to interpret and manage a codified infrastructure. A codified infrastructure that has one or more embedded dynamically labeled resources is received. The meaning of each dynamic label is subject to change based on time and context. Program code converts each dynamic label to zero or more static labels, and effectively generates a statically labeled codified infrastructure. Program code is provided to read the statically labeled codified infrastructure, and construct the architecture as described in the codified infrastructure.

In yet another aspect, a method is provided for interpreting and managing a codified infrastructure that has one or more embedded dynamically labeled resources. The meaning of each dynamic label is subject to change based on time and context. Each dynamic label is converted to zero or more static labels, which effectively generates a statically labeled codified infrastructure. The statically labeled codified infrastructure is read, and an architecture as described in codified infrastructure is constructed.

These and other features and advantages will become apparent from the following detailed description of the presently preferred embodiment(s), taken in conjunction with the accompanying drawings.

BRIEF DESCRIPTION OF THE SEVERAL
VIEWS OF THE DRAWINGS

The drawings reference herein forms a part of the specification. Features shown in the drawings are meant as illustrative of only some embodiments, and not of all embodiments, unless otherwise explicitly indicated.

FIG. 1 depicts a block diagram to illustrate example blueprints.

DETAILED DESCRIPTION

Figure 2:
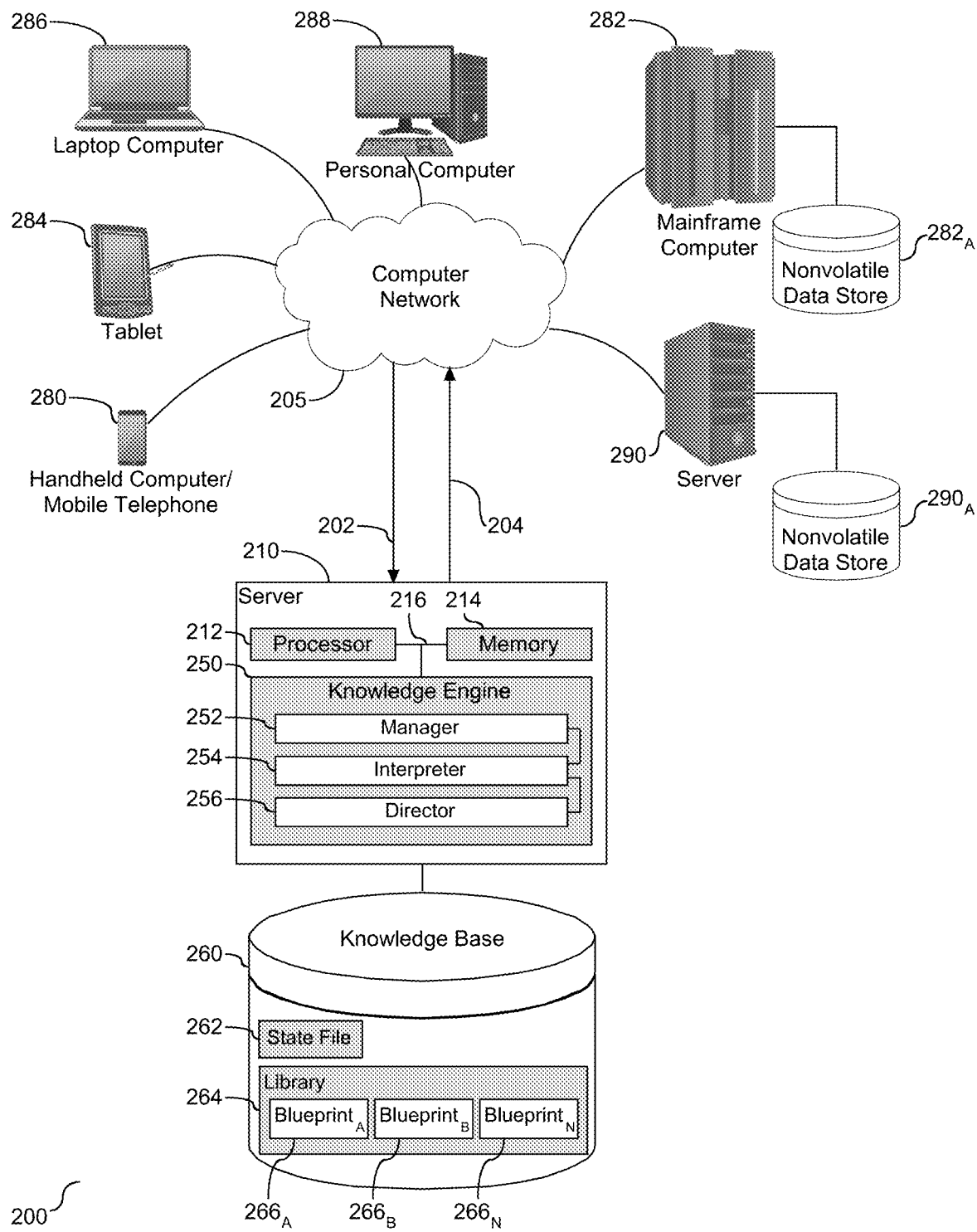
FIG. 2 depicts a system diagram illustrating a schematic diagram of a computer system and embedded tools to support dynamic architecture launching and management.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

A codified infrastructure also referred to herein as a blueprint, is a collection of elements that define an overall landscape of an information project and of associated standard practices. The blueprint represents an architecture of an application or infrastructure, which includes attributes of a machine, the manner in which it is provisioned, and its policy and management settings. In one embodiment, the blueprint is created for provisioning machines in a cloud computing environment in which the blueprint is used to describe a set of inter-related cloud resources and describe how they are to be configured to support interaction. The blueprint is a declarative representation of a workload that is both human and machine readable. The blueprint describes what resources will be created and corresponding resource properties. Blueprints define one or more resources to create, and define relationships and dependencies between the defined resources. Dependencies can be implicitly inferred in the blueprint or explicitly defined. The dependencies between resources ensure that they are created in the correct order. The blueprint is a re-usable asset configured for repeated use. For example, it can be re-used across customers.

However, the blueprint does not describe how to build, e.g. construct, the architecture, such as the order in which the components are created. An orchestration engine interprets the blueprint, determines dependencies among resources, and instantiates the resources. Based on resource dependencies, the orchestration engine automatically establishes an optimal execution path. The blueprint focuses on declaration of resources to include, and the orchestration engine addresses instantiation of these resources. Accordingly, the orchestration engine leverages blueprints to declare sources and compose solutions.

Current use of the blueprint and architecture management is static. As changes to the infrastructure take place, the blueprint will not match the infrastructure. The blueprint needs to be modified and re-deployed to support infrastructure changes. Accordingly, there is a need to resolve the limitations present in blueprint provisioning that supports infrastructure modifications.

The blueprint is both human and machine readable. The blueprint describes resources that will be created and their properties. The blueprint enables a software architect to specify infrastructure parameters without having to write a sequence of programming commands that instruct how to create the resources. Blueprints define one or more resources to be created and define relationships and dependencies between specified resources. Dependencies can be implicitly inferred or explicitly defined. The explicitly defined dependencies between resources ensure that they are created in the correct order and each resource is uniquely named in the blueprint. Each named resource in the blueprint has its property values explicitly set to a value or implicitly set via a reference to a property from a different named resource in the blueprint or implicitly sets via a reference to an input parameter to the blueprint.

Blueprint dependencies can be nested, thereby enabling decomposition of deployment. Decomposition of the nesting is beneficial with respect to readability, re-use, and testing. Parameters in the nesting can be passed from a main blueprint to one or more nested blueprints. The nested blueprint can pass an output variable back to the main blueprint, which enables data exchange between blueprints.

Referring to FIG. 1, a block diagram is provided to illustrate example blueprints. Block diagram (110) illustrates an example blueprint with a resource type defined as a virtual machine. As shown, the blueprint specifies aspects of the resources, including the resource type (120), the name of the resource (130), and resource properties (140). Block diagram (150) illustrates another example blueprint with the resource type defined as a database. As shown, aspects of the resources are specified in the example blueprint, including the resource type (160), the name of the resource (170), the resource properties (180), and resource dependency (190). In this example, the resource dependency (190) references a server, e.g. my_server_1, which is the name of the resource (130). The blueprint examples shown herein, (110) and (150) are re-usable elements and may be subject to repeated use. One or both of the example blueprints shown herein can be re-used across customers and can be repeatedly used in a consistent manner by an orchestration engine. The blueprint can be exported as a readable test file. Use of the blueprint reduces time for managing resources by shifting focus to declaring what they want and eliminates the need for authors to determine how to sequence.

Orchestration refers to management of interconnections and interactions among workloads and infrastructure. An orchestration engine interprets blueprints and uses them as patterns for cloud resources. More specifically, the orchestration engine creates, configures, and instantiates computational resources, such as infrastructure, virtual machines, middleware, etc. Accordingly, the orchestration leverages blueprints to declare sources and compose solutions.

Referring to FIG. 2, a computer system (200) is provided with tools to support document processing and indexing. As shown, a server (210) is provided in communication with a plurality of computing devices (280), (282), (284), (286), and (288) across a network connection (205). The server (210) is configured with a processing unit (212) operatively coupled to memory (214) across a bus (216). A tool in the form of a knowledge engine (250) is shown local to the server (210), and operatively coupled to the processing unit (212) and memory (214). As shown, the knowledge engine (250) contains one or more tools in the form of a manager (252), an interpreter (254), and a director (256) to provide dynamic blueprint interpretation and management over the network (205) from one or more computing devices (280), (282), (284), (286) and (288). More specifically, the computing devices (280), (282), (284), (286), and (288) communicate with each other and with other devices or components via one or more wires and/or wireless data communication links, where each communication link may comprise one or more of wires, routers, switches, transmitters, receivers, or the like. In this networked arrangement, the server (210) and the network connection (205) enable dynamic blueprint interpretation and management. Other embodiments of the server (210) may be used with components, systems, sub-systems, and/or devices other than those that are depicted herein.

The tools, including the knowledge engine (250), or in one embodiment, the tools embedded therein including the manager (252), the interpreter (254), and the director (256) may be configured to receive input from various sources, including but not limited to input from the network (205), and a knowledge base (260). In one embodiment, the knowledge base (260) includes a state file (262) or log populated with current system status, and a structure or library (264) of existing blueprints, shown herein as blueprint$_A$ (266$_A$), blueprint$_B$ (266$_B$), and blueprint$_N$ (266$_N$). The quantity of blueprints in the structure or library (264) is for illustrative purposes and should not be considered limiting. In one embodiment, the blueprints, stored in the structure or library (264) are stored in vector format, as shown and described in FIG. 6.

The various computing devices (280), (282), (284), (286), and (288) in communication with the network (205) demonstrate access points for blueprint creators and blueprint users. Some of the computing devices may include devices for a database storing the corpus of data as a body of information used by the knowledge engine (250), and in one embodiment the tools (252)-(254), to support and enable dynamic management of the codified infrastructure, and the director (256) to support and enable a launch of an architecture based on the codified infrastructure. The network (205) may include local network connections and remote connections in various embodiments, such that the knowledge engine (250) and the embedded tools (252)-(256) may operate in environments of any size, including local and global, e.g. the Internet. Accordingly, the server (210) and the knowledge engine (250) serve as a front-end system, with the knowledge base (260) and blueprints(s) (266$_A$)-(266$_N$) serving as the back-end system.

As shown, the knowledge base (260), which functions as a data store, is operatively coupled to the server (210). Content users may access the system via API administration or orchestration platforms, as shown and described in FIG. 3.

As described in detail below, the server (210) and the knowledge engine (250) interpret and manage an executable codified infrastructure, e.g. blueprint(s). The management includes deploying a corresponding architecture and dynamically adapting the architecture based on resource changes. The knowledge engine (250) utilizes the manager (252) to embed or otherwise attach and define one or more dynamic labels into the codified infrastructure. Each dynamic label is a key value pair, whose interpretation is dynamic. The label's meaning is subject to change based on time and context even though the text of the key and value remain unchanged. Accordingly, the manager (252) embeds or encodes one or more dynamically labeled resources into the codified infrastructure.

The interpreter (254), which is shown herein operatively coupled to the manager (252), functions within the knowledge engine (250) to launch the codified infrastructure. More specifically, the interpreter (254) functions to identify the embedded dynamic labels and to construe their value based on both time and context. Based on the label identification, the interpreter (254) converts the dynamic labels into static labels populated with current values, and generates a statically labeled codified infrastructure with the populated static labels for updating provisioned workload. Accordingly, the interpreter (254) generates a new codified infrastructure using the static label values converted from the dynamic labels of the dynamically codified infrastructure.

Once the codified infrastructure has been transformed by the interpreter (254) with the dynamic labels effectively converted to static labels, the director (256) launches the codified infrastructure effectively creating and deploying an architecture based on the protocols provided in the codified infrastructure. The label conversion may be zero or more labels because in one embodiment, one library may encapsulate another, thereby making the label conversion unnecessary. In one embodiment, the deployed architecture includes machines provisioned in a cloud computing environment together with a set of inter-related cloud resources to support interaction. It is understood that aspects of the architecture are subject to change over time. For example, one or more of the deployed machines or resources may be subject to reconfiguration, replacement, updates or patching. Similarly, in one embodiment, dependencies among the deployed machines or resources may be subject to change. The codified infrastructure, and more specifically, the dynamic labels populated in the codified infrastructure, is adapted to detect changes in the deployed machines and resources and to update the launched architecture with the detected changes. The interpreter (254) is configured to listen to any changes in the provisioned machines and resources, with the changes reflected in the dynamic labels of the codified infrastructure. The listening is automated, so that changes are detected and reflected. In one embodiment, not all changes to the labels require changes to the launch architecture. If the label change is within a range or bound defined by label limits, no changes may be required in the launched infrastructure. However, changes in one or more of the labels that do require a change are dynamically reflected into the launched architecture by the director (256), which in one embodiment includes a dynamic modification of the launched architecture to reflect the detected label change. The dynamic reflection enables the director (256) to provide pre-deployment configuration of a post-deployment action. Accordingly, the dynamic labels of the codified infrastructure continue to function after the launch of the architecture by transforming to a listening mode of changes to corresponding machines or resource and their provisioning in the architecture.

It is understood in the art that the executable codified infrastructure is complex and intricate, and is frequently created by stitching together templates. These templates may be found via keyword searching or browsing blueprints, such as a catalog of blueprints or partial blueprints. However, it is understood that when creating infrastructure, different developers may encounter similar errors on system configuration. Although developers may share solutions for similarly encountered errors, finding these solutions and incorporating the solutions is challenging. The manager (252) is configured with functionality to facilitate in the authorship of the codified infrastructure. In one embodiment, the manager (252) converts the codified infrastructure to a feature vector that contains information and features describing the blueprint. As shown and described below in FIG. 6, the manager (252) leverages a discovery algorithm to identify details or components in a received or provided codified infrastructure. Such details or components may include, but are not limited to, the infrastructure provider, resources, e.g. virtual machines, databases, load balancer, etc., and values of the resources. Accordingly, the manager (252) identifies components within the infrastructure and their corresponding values, and reflects the components and values into the feature vector.

The manager (252) leverages the knowledge base (260), and more specifically the library (264) of existing blueprints to identify one or more existing blueprints with similar resources or features. The identified blueprint(s) may include a list of blueprints that are similar to the current blueprint. In one embodiment, the blueprints referenced in the database or storage are either represented in a feature vector format or converted to a feature vector format. In the case of submission of a partial blueprint, the identified blueprint(s) may include a section of a blueprint similar to the partial blueprint. The manager (252) may leverage the identified and completed similar blueprint(s) and suggest or automatically complete authorship of the codified infrastructure. For example, the manager (252) may provide: a list of similar blueprints to be consulted for their coding and solutions, a segment of a similarly codified infrastructure, and/or suggest syntax. Accordingly, the manager (252) is configured to discover similarly classified blueprint(s) and to leverage the discovery for auto-completion of a blueprint that is the subject of authorship.

Though shown as being embodied in or integrated with the server (210), the knowledge engine (250) may be implemented in a separate computing system (e.g., 290) that is connected across the network (205) to the server (210). Although shown local to the server (210), the tools (252)-(256) may be collectively or individually distributed across the network (205). Wherever embodied, the manager (252), interpreter (254), and director (256) are utilized to manage and dynamically support launching of the architecture as represented in a codified infrastructure embedded with one or more dynamic labels.

Codified infrastructures may be communicated to the server (210) across the network (205). For example, in one embodiment, one or more codified infrastructures may be communicated to the server (210) from nonvolatile data store ($290_A$). The manager (252) processes the codified infrastructure(s), whether from the knowledge base (260) or across the network (205). It is understood that different codified infrastructures may have different formats. The manager (252) may utilize a discovery algorithm to identify resources and components within the infrastructure and to create or amend a feature vector representative of the codified infrastructure. Accordingly, the created feature vector addresses syntax and formatting of the codified infrastructure(s).

Types of information handling systems that can utilize server (210) range from small handheld devices, such as a handheld computer/mobile telephone (280) to large mainframe systems, such as a mainframe computer (282). Examples of a handheld computer (280) include personal digital assistants (PDAs), personal entertainment devices, such as MP4 players, portable televisions, and compact disc players. Other examples of information handling systems include a pen or tablet computer (284), a laptop or notebook computer (286), a personal computer system (288) and a server (290). As shown, the various information handling systems can be networked together using computer network (205). Types of computer network (205) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (290) utilizes nonvolatile data store ($290_A$), and mainframe computer (282) utilizes nonvolatile data store ($282_A$). The nonvolatile data store ($282_A$) can be a component that is external to the various information handling systems or can be internal to one of the information handling systems.

An information handling system may take many forms, some of which are shown in FIG. 2. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
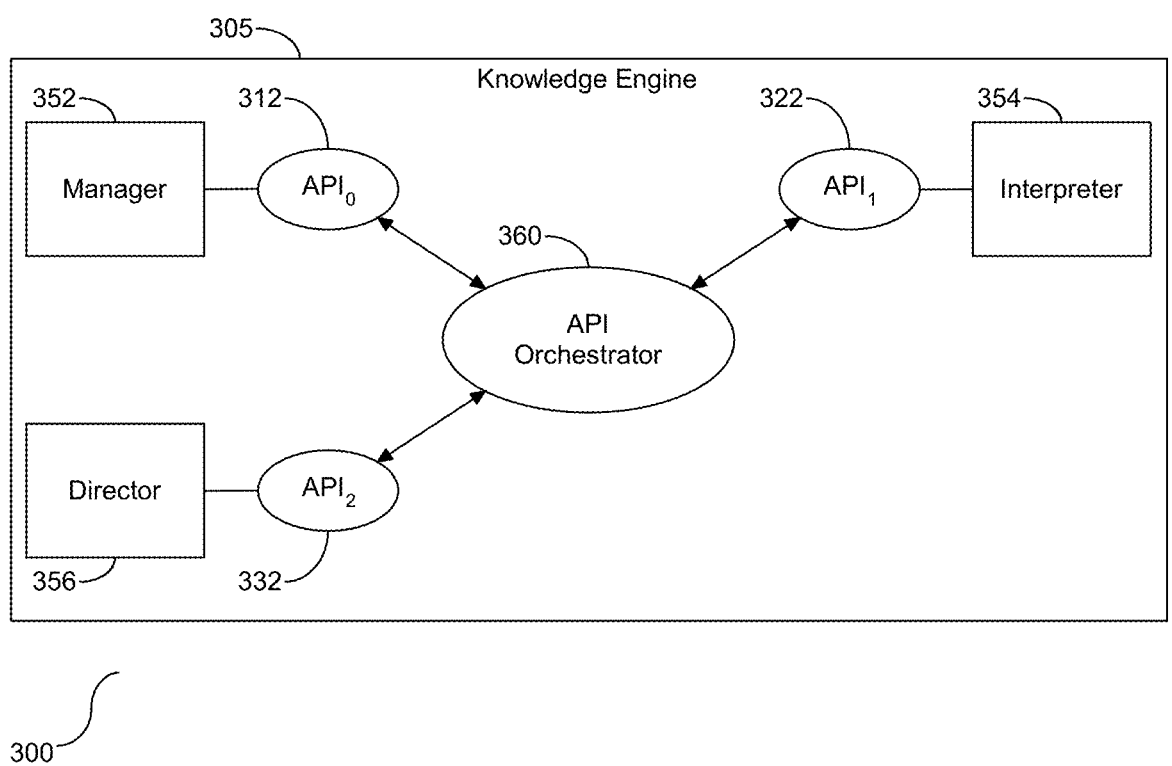
FIG. 3 depicts a block diagram illustrating the tools shown in FIG. 2 and their associated APIs.

An Application Program Interface (API) is understood in the art as a software intermediary between two or more applications. With respect to the document processing system shown and described in FIG. 3, one or more APIs may be utilized to support one or more of the manager (252), interpreter (254), and director (256) and their associated functionality. Referring to FIG. 3, a block diagram (300) is provided illustrating the document processing tools and their associated APIs. As shown, a plurality of tools are embedded within the knowledge engine (305), with the tools including the manager (352) associated with $API_0$ (312), the interpreter (354) associated with $API_1$ (322), and the director (356) associated with $API_2$ (332). Each of the APIs may be implemented in one or more languages and interface specifications. $API_0$ (312) provides support for authorship and receipt of the codified infrastructure; $API_1$ (322) provides support for interpretation of the codified infrastructure, including identification of dynamically encoded labels and conversion of the codified infrastructure with dynamic labels to a codified infrastructure with static labels; and $API_2$ (332) provides support for launching an architecture based on the converted and statically labeled codified infrastructure. As shown, each of the APIs (312), (322), and (332) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
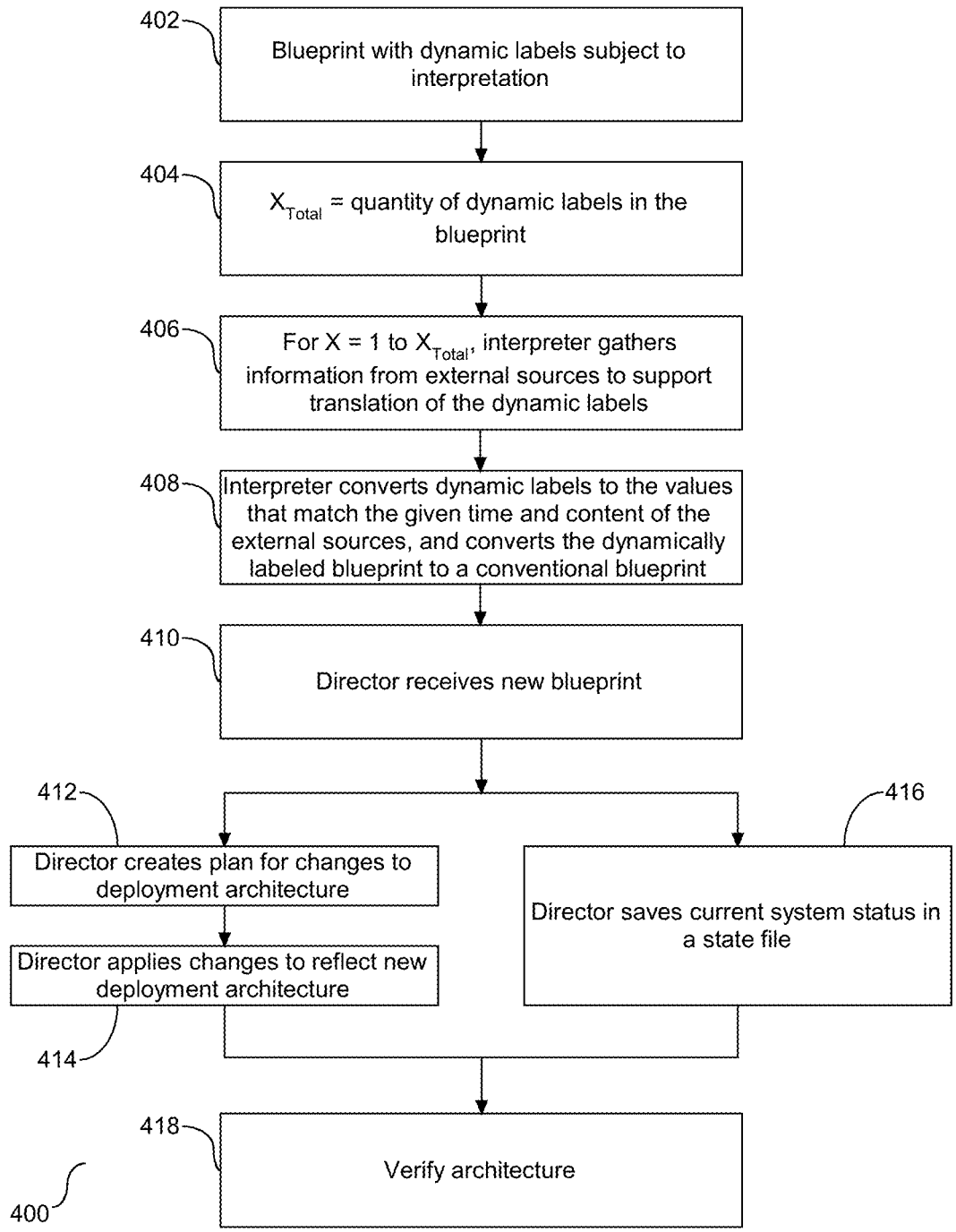
FIG. 4 depicts a flow chart to illustrate a process for automating management of architectures in a declarative manner.

Referring to FIG. 4, a flow chart (400) is provided illustrating a process for automating management of architectures in a declarative manner. Resources are identified in the blueprint with dynamic labels. The meaning of the labels is subject to change depending on time and context, but the labels remain the same. More specifically, the architecture changes, the blueprints remain unchanged and up-to-date, and the management is automated. As shown and described herein, the dynamic labels are subject to interpretation, which in one embodiment requires external resources to be checked for changes in order to keep the architecture up-to-date with the blueprint. A dynamically labelled blueprint is generated or otherwise provided (402). As shown and described in FIG. 2, the interpreter (254) provides the functional support required for the interpretation of the blueprint. The quantity of dynamic labels in the blueprint is assigned to the variable $X_{Total}$ (404). For each dynamic label, e.g. $label_X$, the interpreter gathers information from external sources to support translation of the dynamic labels (406). The information gathering at step (406) may include a plugin code and Application Program Interface (API) calls to gather information, such as a list of versions, to support translation of the dynamic labels. Accordingly, the generated, or in one embodiment provided, blueprint and the dynamic labels therein are subject to translation.

It is understood that the dynamic labels that are in the blueprint are comprised of key value pairs when the value's content stays the same but its meaning changes depending on time and context. As shown, the interpreter may make API requests to external sources referenced in the blueprint to gather information (406), such as a list of versions, and in one embodiment to interpret which items in the list is the most recent or current version. Using the data value(s) gathered at step (406), the dynamic labels are replaced with zero or more constant labels, e.g. static labels that match the meaning of the dynamic labels at the given time (408). The replacement at step (408) effectively converts the blueprint with the dynamic labels to a conventional blueprint with static labels containing the gathered values. Accordingly, the dynamically labeled blueprint is subject to conversion into a conventional blueprint.

The replacement blueprint created at step (408), which is an executable blueprint, is received by the director (410) and subject to deployment. The director creates a plan for the changes to the deployment architecture (412). The director applies the changes to reflect the new deployment architecture (414). In addition to the plan creation at steps (412) and (414), a state file or log is created and populated with current system status (416) following receipt of the blueprint at step (410). As shown, the aspect of populating the state file at step (416) is conducted parallel to gathering and inserting the external source values into the blueprint, as shown at steps (412) and (414). In one embodiment, step (416) may be sequential with steps (412) and (414). Following either step (414) or (416), the architecture based on the infrastructure indicated in the blueprint is optionally verified (418). At the conclusion of step (418), the deployment architecture reflects the state desired by the dynamic labels in the blueprint.

Figure 5:
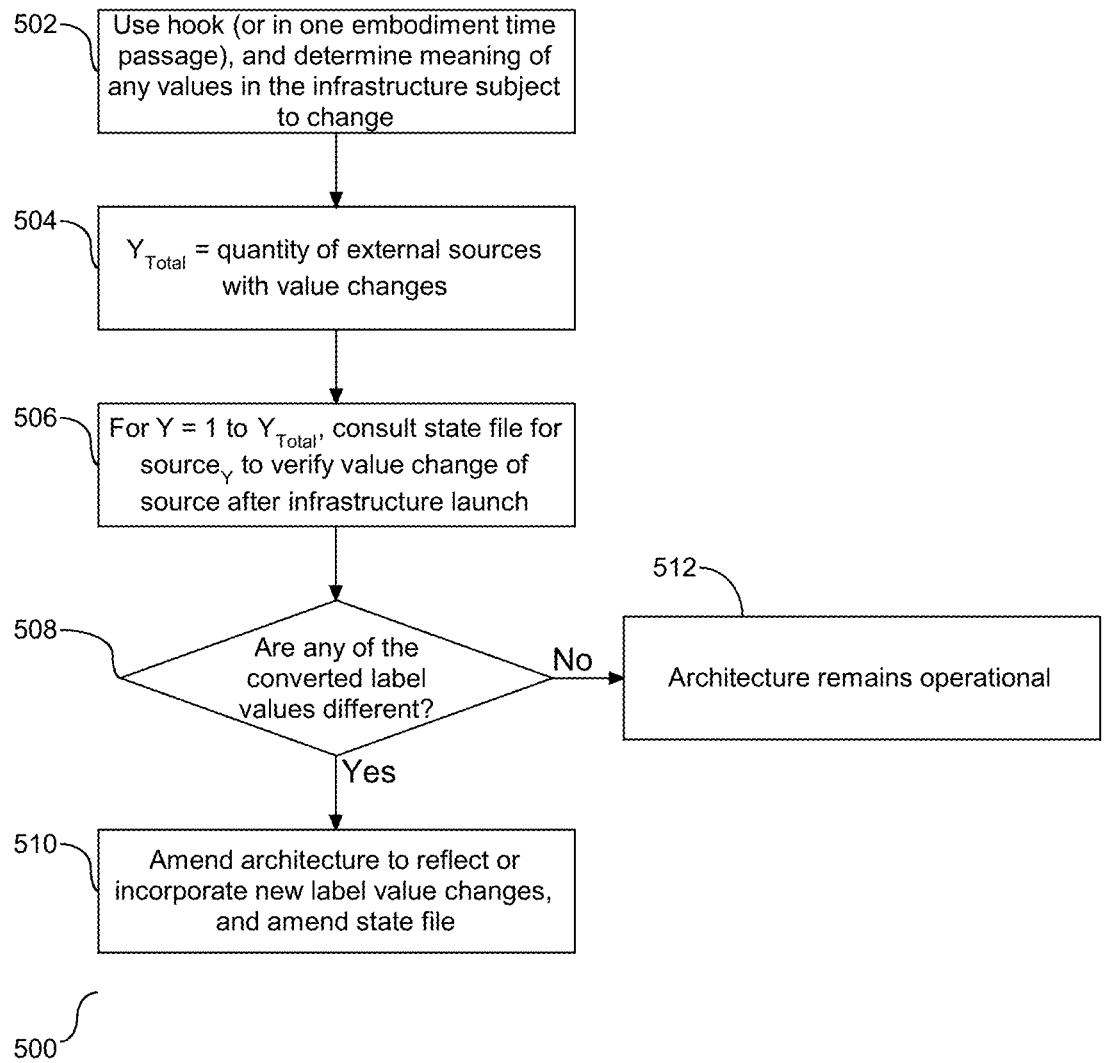
FIG. 5 depicts a flow chart to illustrate management of resource value changes in a launched infrastructure.

The use of dynamic labeling in the blueprint enables the blueprint to dynamically adapt to changes in referenced external resources. However, even after the infrastructure is launched, it is understood that the values of one or more of the referenced resource(s) may be subject to change, and that these changes should be reflected in the blueprint. Referring to FIG. 5, a flow chart (500) is provided to illustrate management of resource value changes in a launched infrastructure. The external sources that are part of the launch infrastructure are subject to monitoring to determine the meaning of their values that may have been subject to change (502). In one embodiment, the external sources may be subject to review on a periodic or non-periodic basis. In another embodiment, a hook may be activated at such time as a change occurs. The variable $Y_{Total}$ is assigned to the quantity of external sources that have been preliminarily identified with value changes (504). For each external $source_Y$, the state file populated at step (418) is consulted to verify that there is a changed value associated with the external source that has occurred after the launch of the infrastructure (506). It is then determined if any of the converted label values referenced in the state file and reflected in the launched infrastructure are different from the changes detected at step (508). A positive response is followed by amending the architecture to reflect or otherwise incorporate the new label value changes and to reflect the new label value changes in the state file (510). However, a negative response allows the launched infrastructure to remain active and operational (512). Accordingly, the dynamic labels support continuous monitoring so that the infrastructure remains current with referenced external sources.

Figure 6:
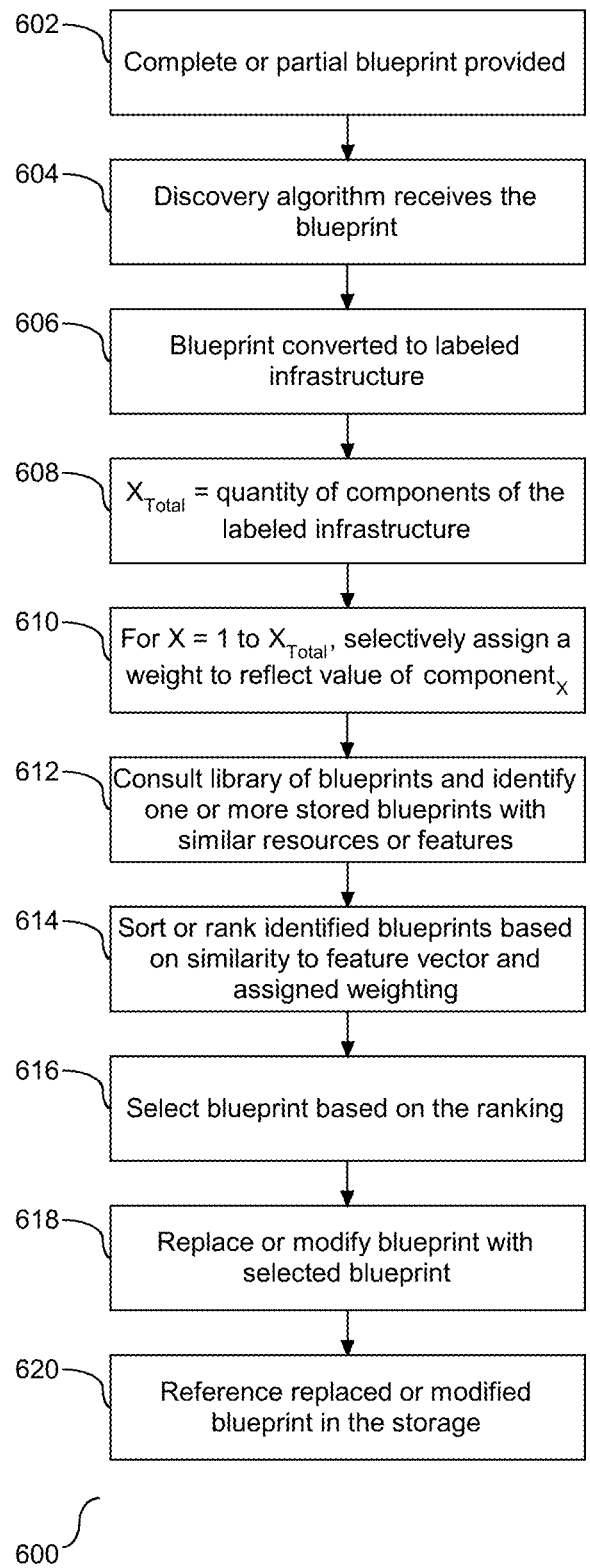
FIG. 6 depicts a flow chart to illustrate a process for assisted authoring of a blueprint.

Creation of blueprints is the creation of infrastructure-as-code. As shown in FIGS. 4 and 5, blueprints may support dynamic configuration. It is understood in the art that conventional blueprint creation is currently done by stitching together templates. These templates may be found via keyword searching or browsing blueprints, such as a catalog of blueprints or partial blueprints. However, it is understood that when creating infrastructure, different developers may encounter similar errors on system configuration. Although developers may share solutions for similarly encountered errors, finding these solutions and incorporating the solutions is challenging. Referring to FIG. 6, a flow chart (600) is provided to illustrate a process for assisted authoring of a blueprint. As shown, a developer has a complete or partial blueprint, e.g. codified infrastructure (602). A discovery algorithm receives the completed or partial blueprint (604) and converts the received blueprint to a labeled infrastructure, e.g. feature vector, (606). At step (604), the discovery algorithm identifies the details or components in the received blueprint. Such details or components may include, but are not limited to, the infrastructure provider, resources, e.g. virtual machines, databases, load balancer, etc., and values of the resources. In one embodiment, a natural language processing (NLP) may be utilized to discover components and component categories, and to match individual resources. Examples of the identified resources include, but are not limited to, cloud services provider, resources, such as virtual machine(s), load balancer(s), and database(s). As is understood in the art, a feature vector is a vector that contains information describing characteristics of an object. In this case, the feature vector created at step (606) is a vector that contains information and features describing the blueprint. Accordingly, the blueprint is subject to discovery analysis with identification of the component and their corresponding values.

The variable $X_{Total}$ is assigned to the quantity of details or components reflected in the feature vector (608). It is understood that the developer of the blueprint that is the subject of the assisted authoring may consider some components of greater value than other components. For each detail or component, X, in the vector, a weighting may be selectively assigned to reflect the value of the component as dictated by the developer (610). A database or storage of blueprints is consulted and queried with respect to the feature vector to identify one or more existing blueprints with similar resources or features (612). In one embodiment, the database or storage may include or maintain a list of blueprints or blueprint characteristic data to facilitate identification of one or more existing blueprints that is similar in content and design to the current blueprint that is in the process of being authored or is partially completed. In the case of submission of a partial blueprint, the identified blueprint(s) may include a section of a blueprint similar to the partial blueprint. In one embodiment, the blueprints referenced in the database or storage is converted to a feature vector format. The identified blueprint(s) from the database or storage are subject to a ranking based on one or more factors, such as similarity to the feature vector and the assigned weighting of one of more of the components (614). Based on the ranking, one of the returned blueprints is selected (616) and utilized by the developer to replace or modify the existing blueprint (618). In addition, the replaced or modified blueprint is referenced in the database or storage, and in one embodiment in vector form, so that it may be leveraged for future blueprint development (620). Accordingly, the discovery algorithm leverages a library of existing blueprints to facilitate completion of a partial blueprint or correction of an existing blueprint based on blueprint details or components that define functional blueprint elements.

Figure 7:
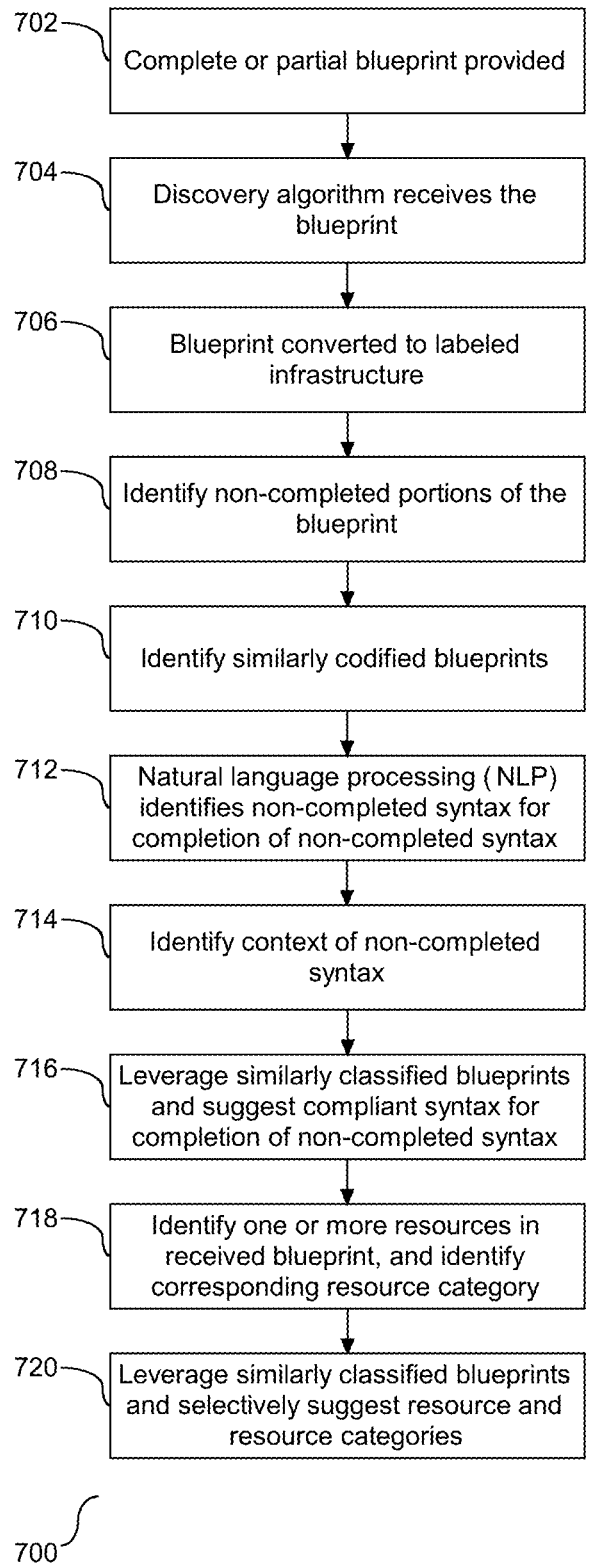
FIG. 7 depicts a flow chart to illustrate a process for expanding autocomplete functionality to the blueprint environment.

Autocomplete is a computer program that automatically predicts one or more remaining characters in a word or phrase based on what has been typed or input before. This functionality is present in word processors, electronic mail programs, and web browsers. Referring to FIG. 7, a flow chart (700) is provided to illustrate a process for expanding autocomplete functionality to the blueprint environment. As shown, a developer has a complete or partial blueprint, e.g. codified infrastructure (702). A discovery algorithm receives the completed or partial blueprint (704) and converts the received blueprint to a labeled infrastructure, e.g. feature vector, (706). One or more non-completed portions of the codified blueprint are identified (708) and one or more similarly codified blueprints are also identified (710). Non-completion of the blueprint may come in different forms or levels, including but not limited to, text completion of a word, phrase or sentence, resource definition(s), resource property value(s) of given key(s), new resources based on current resources, replacement of a source section with a module, and suggestion or similar blueprints to a completed blueprint. At the same time, completion of the non-complete blueprint is enabled with similarly codified blueprints. Accordingly, the initial aspect of auto-completion of the blueprint is directed at creation of the blueprint feature vector and identification of similarly classified blueprints.

With respect to text, word, phrase, sentence completion, or resource definition(s), hereinafter referred to collectively as text, natural language processing (NLP) is utilized for text identification and completion. Non-completed syntax, e.g. text, in the blueprint is identified (712), and context of the non-completed syntax is also identified (714). One or more similarly classified blueprints are leveraged with respect to the identified non-completed syntax and context, and compliant syntax is suggested for completion of the non-completed syntax (716). With respect to resources, it is understood that there are different categories of resources and guidance may be provided to enhance selection or assignment of the resource categories. In one embodiment, the guidance may be supported by cognitive computing and NLP. For example, the cognitive computing may leverage selection and assignment of resources in similarly classified blueprints, and NLP guidance may evaluate syntax with respect to resources selected in similarly classified blueprints. One or more resources in the received blueprint are identified (718), and for each identified resource a corresponding resource category is identified. Similar to the non-complete text processing, one or more similarly classified blueprints are leveraged with respect to the identified resource(s), and new resources or new resource categories are selectively suggested and applied to the subject blueprint (720). Similar logic may be applied with respect to replacement of resource sections with modules. Specifically, similarly classified blueprints are leveraged and text, resources, resource categories, or modules are selectively suggested for replacement or completion of the blueprint. In one embodiment, a user interface (UI) functions as a platform for presentation and selection of the suggestions. Accordingly, similarly classified blueprints are employed to intelligently facilitate completion or replacement of aspects of the blueprint.

Completion of auto-completion of the blueprint shown and described in FIG. 7 provides logic to selectively complete or replace functional resources identified in the blueprint by leveraging knowledge provided in a database or storage of blueprints. After the replacement is completed, the process returns to step (412) in FIG. 4 for processing and launching of the blueprint. Accordingly, as the blueprint is subject to modification, the orchestration engine continues to supervise launching of the corresponding infrastructure and maintenance of the state file.

The tools shown in FIG. 2, together with the associated processes and functionality shown in the flow charts of FIGS. 4-7, illustrate use of a computer implemented intelligent agent, e.g. knowledge engine, to conduct or facilitate architecture launching and maintenance with use of dynamically labeled codified infrastructure(s).

Figure 8:
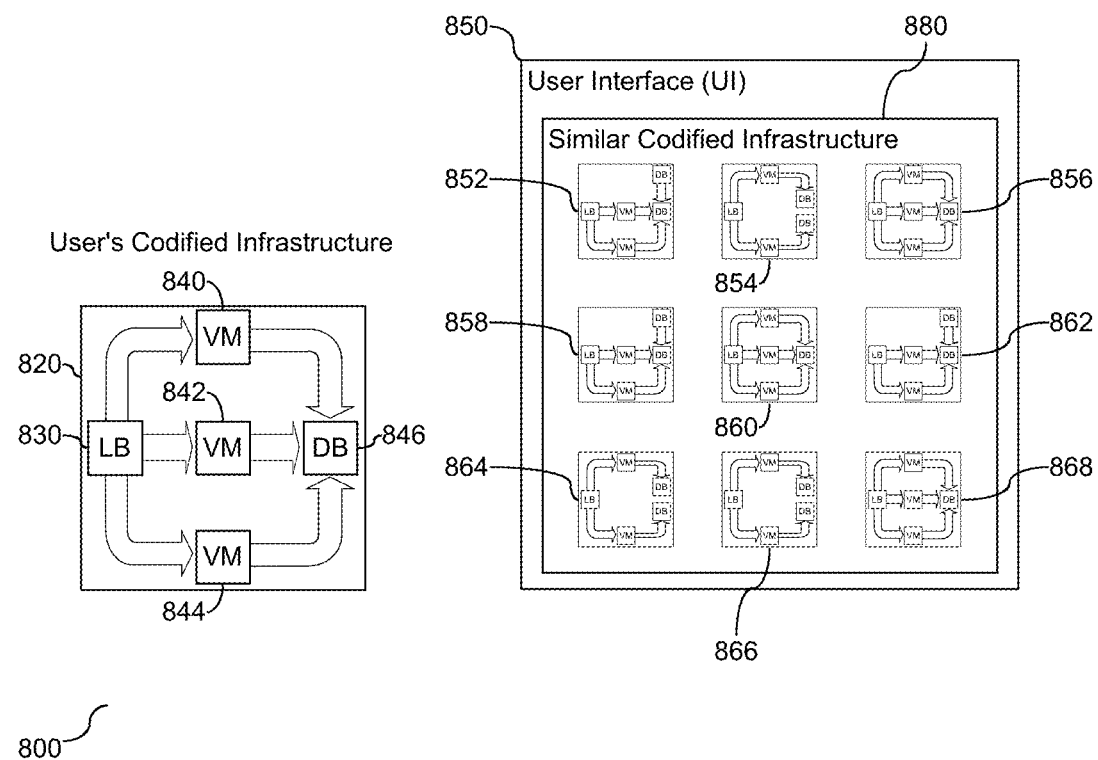
FIG. 8 depicts a block diagram to illustrate processing of a blueprint.

Referring to FIG. 8, a block diagram (800) is provided to illustrate processing of a blueprint. As shown, a sample blueprint (820) is provided or received. The blueprint (820) is shown with a load balanced (830) operatively coupled to virtual machines (840), (842), and (844) and a database (846). A User Interface (UI) (850) is shown with a plurality of similarly classified blueprints (880), including (852), (854), (856), (858), (860), (862), (864), (866), and (868). As shown and described in FIG. 6, the discovery algorithm may be leveraged to identify similarly classified blueprints for presentation on the UI (850). The quantity of similarly classified blueprints shown on the UI (850) is merely illustrative and should not be considered limiting. The UI (850) functions as a platform to enable and support selection of one of the similarly classified blueprints for replacement or completion of the sample blueprint (820). Accordingly, the UI (850) functions as an interactive platform for presentation and selection of similarly classified blueprints to facilitate completion or replacement of a similarly codified infrastructure.

With references to FIG. 9, a block diagram (900) is provided illustrating an example of a computer system/server (902), hereinafter referred to as a host (902) in communication with a cloud based support system, to implement the system and processes described above with respect to FIGS. 4-8. Host (902) is operational with numerous other general purpose or special purpose computing system environments or configurations. Examples of well-known computing systems, environments, and/or configurations that may be suitable for use with host (902) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (902) may be described in the general context of computer system-executable instructions, such as program modules, being executed by a computer system. Generally, program modules may include routines, programs, objects, components, logic, data structures, and so on that perform particular tasks or implement particular abstract data types. Host (902) may be practiced in distributed cloud computing environments (910) where tasks are performed by remote processing devices that are linked through a communications network. In a distributed cloud computing environment, program modules may be located in both local and remote computer system storage media including memory storage devices.

Figure 9:
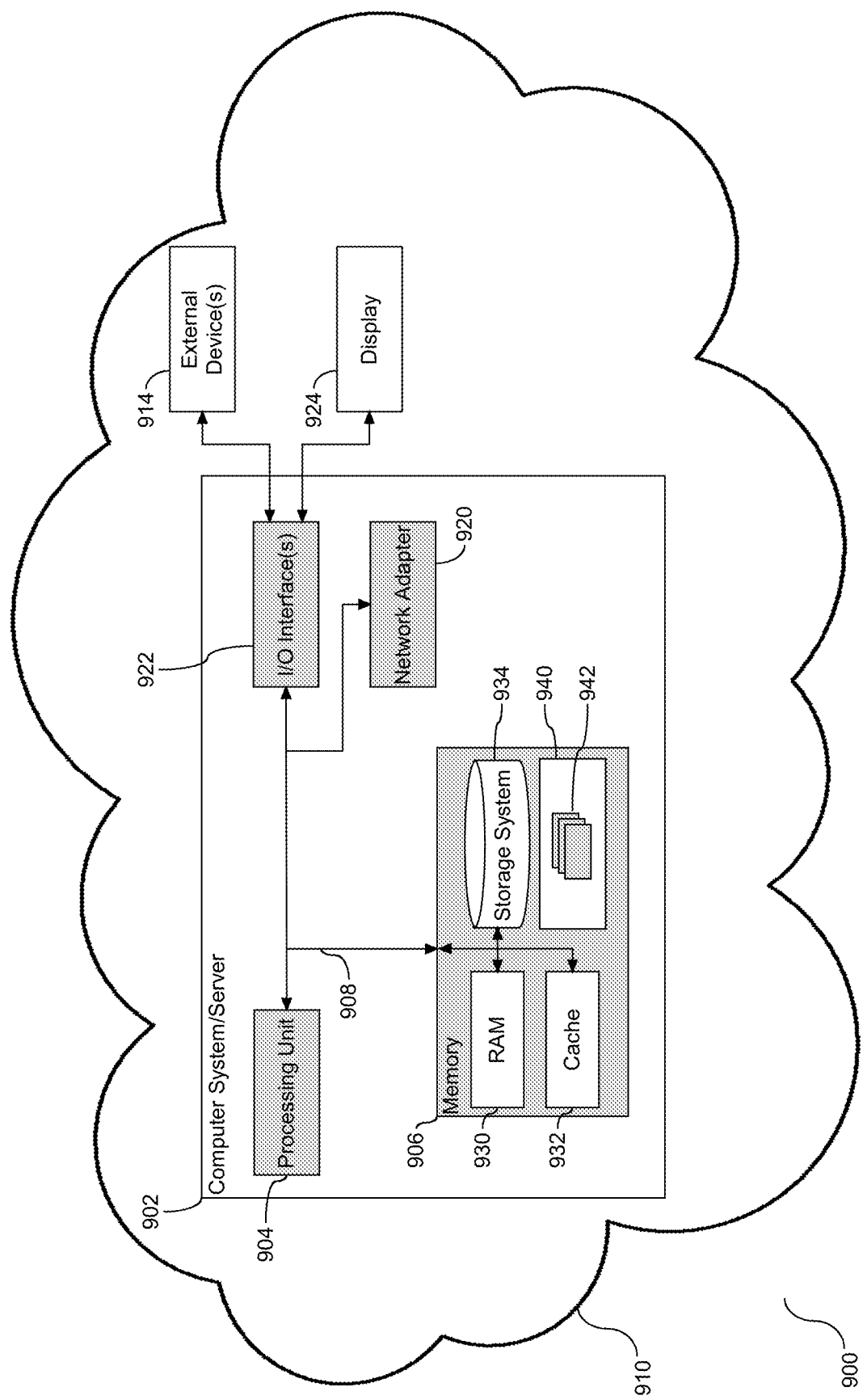
FIG. 9 is a block diagram depicting an example of a computer system/server of a cloud based support system, to implement the system and processes described above with respect to FIGS. 2-7.

As shown in FIG. 9, host (902) is shown in the form of a general-purpose computing device. The components of host (902) may include, but are not limited to, one or more processors or processing units (904), a system memory (906), and a bus (908) that couples various system components including system memory (906) to processor (904). Bus (908) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (902) typically includes a variety of computer system readable media. Such media may be any available media that is accessible by host (902) and it includes both volatile and non-volatile media, removable and non-removable media.

Memory (906) can include computer system readable media in the form of volatile memory, such as random access memory (RAM) (930) and/or cache memory (932). By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (908) by one or more data media interfaces.

Program/utility (940), having a set (at least one) of program modules (942), may be stored in memory (906) by way of example, and not limitation, as well as an operating system, one or more application programs, other program modules, and program data. Each of the operating systems, one or more application programs, other program modules, and program data or some combination thereof, may include an implementation of a networking environment. Program modules (942) generally carry out the functions and/or methodologies of embodiments of the adversarial training and dynamic classification model evolution. For example, the set of program modules (942) may include the modules configured as the tools (252)-(256) described in FIG. 2.

Host (902) may also communicate with one or more external devices (914), such as a keyboard, a pointing device, a sensory input device, a sensory output device, etc.; a display (924); one or more devices that enable a user to interact with host (902); and/or any devices (e.g., network card, modem, etc.) that enable host (902) to communicate with one or more other computing devices. Such communication can occur via Input/Output (I/O) interface(s) (922). Still yet, host (902) can communicate with one or more networks such as a local area network (LAN), a general wide area network (WAN), and/or a public network (e.g., the Internet) via network adapter (920). As depicted, network adapter (920) communicates with the other components of host (902) via bus (908). In one embodiment, a plurality of nodes of a distributed file system (not shown) is in communication with the host (902) via the I/O interface (922) or via the network adapter (920). It should be understood that although not shown, other hardware and/or software components could be used in conjunction with host (902). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (906), including RAM (930), cache (932), and storage system (934), such as a removable storage drive and a hard disk installed in a hard disk drive.

Computer programs (also called computer control logic) are stored in memory (906). Computer programs may also be received via a communication interface, such as network adapter (920). Such computer programs, when run, enable the computer system to perform the features of the present embodiments as discussed herein. In particular, the computer programs, when run, enable the processing unit (904) to perform the features of the computer system. Accordingly, such computer programs represent controllers of the computer system.

In one embodiment, host (902) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 10:
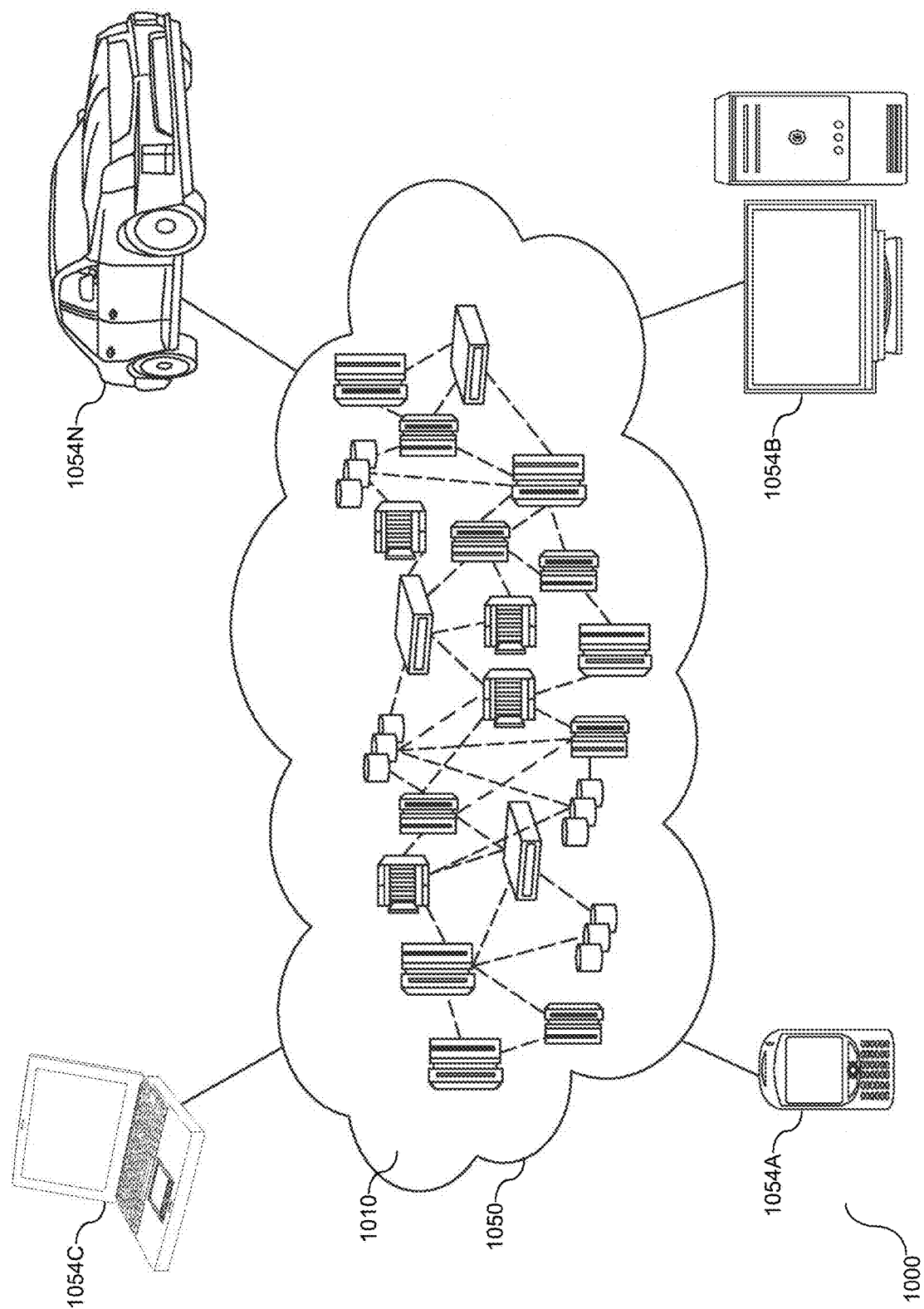
FIG. 10 depicts a block diagram illustrating a cloud computer environment.

Referring now to FIG. 10, an illustrative cloud computing network (1000). As shown, cloud computing network (1000) includes a cloud computing environment (1050) having one or more cloud computing nodes (1010) with which local computing devices used by cloud consumers may communicate. Examples of these local computing devices include, but are not limited to, personal digital assistant (PDA) or cellular telephone (1054A), desktop computer (1054B), laptop computer (1054C), and/or automobile computer system (1054N). Individual nodes within nodes (1010) may further communicate with one another. They may be grouped (not shown) physically or virtually, in one or more networks, such as Private, Community, Public, or Hybrid clouds as described hereinabove, or a combination thereof. This allows cloud computing environment (1000) to offer infrastructure, platforms and/or software as services for which a cloud consumer does not need to maintain resources on a local computing device. It is understood that the types of computing devices (1054A-N) shown in FIG. 10 are intended to be illustrative only and that the cloud computing environment (1050) can communicate with any type of computerized device over any type of network and/or network addressable connection (e.g., using a web browser).

Figure 11:
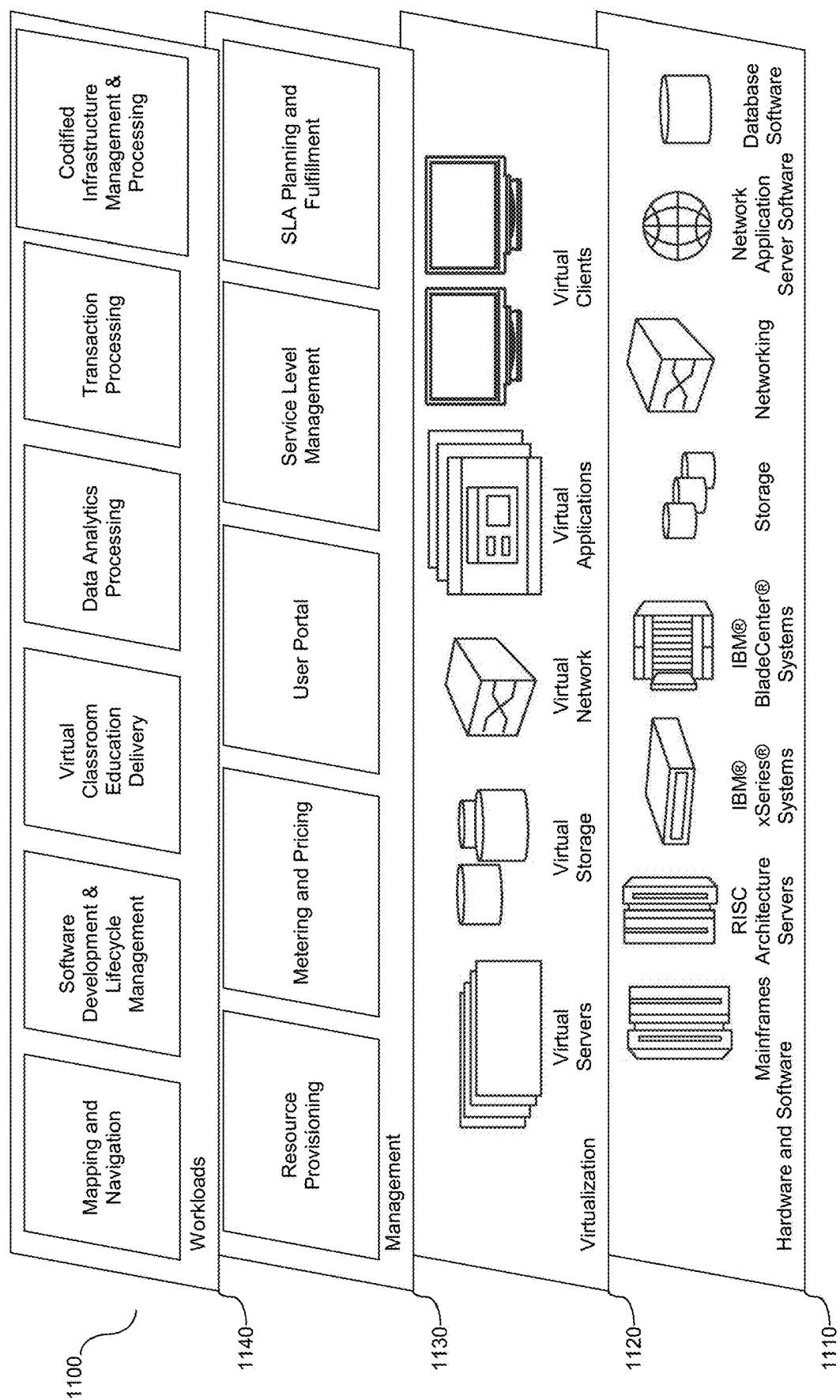
FIG. 11 depicts a block diagram illustrating a set of functional abstraction model layers provided by the cloud computing environment.

Referring now to FIG. 10, a set of functional abstraction layers (1000) provided by the cloud computing network of FIG. 10 is shown. It should be understood in advance that the components, layers, and functions shown in FIG. 11 are intended to be illustrative only, and the embodiments are not limited thereto. As depicted, the following layers and corresponding functions are provided: hardware and software layer (1110), virtualization layer (1120), management layer (1130), and workload layer (1140). The hardware and software layer (1110) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1120) provides an abstraction layer from which the following examples of virtual entities may be provided: virtual servers; virtual storage; virtual networks, including virtual private networks; virtual applications and operating systems; and virtual clients.

In one example, management layer (1130) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1140) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and codified infrastructure management and processing.

The system and flow charts shown herein may also be in the form of a computer program device for use with an intelligent computer platform in order to facilitate document enrichment and indexing. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of document enrichment and indexing.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the codified infrastructure, including the embedded dynamic labels, and management and processing of the codified infrastructure may be carried out by different computing platforms or across multiple devices. Furthermore, the data storage and/or corpus may be localized, remote, or spread across multiple systems. Accordingly, the scope of protection of the embodiment(s) is limited only by the following claims and their equivalents.

What is claimed is:

1. A computer system comprising:
    a processing unit operatively coupled to memory; and
    a knowledge engine operatively coupled to the processing unit, the knowledge engine configured to interpret and manage an executable codified infrastructure, the knowledge engine comprising:
        a manager configured to receive the executable codified infrastructure, the codified infrastructure including a dynamically labeled resource, wherein a meaning of the dynamically labeled resource changes depending on time and context;
        an interpreter operatively coupled to the manager, the interpreter configured to construe the dynamically labeled resource and to selectively convert a dynamic label of the construed dynamically labeled resource in the codified infrastructure into a static label, and to generate a statically labeled codified infrastructure; and
        a director, operatively coupled to the interpreter, configured to construct and deploy an architecture described in the statically labeled codified infrastructure, and to selectively and dynamically update the deployed architecture responsive to a detected change of a provisioned resource.

2. The system of claim 1, further comprising the interpreter configured to construe the dynamically labeled resource, including check an external resource corresponding to the label and identify a value of the external resource.

3. The system of claim 1, further comprising the interpreter to detect the change in the meaning of the dynamically labeled resource, wherein the dynamic update maintains the codified infrastructure in accordance with the meaning change.

4. The system of claim 1, wherein the dynamic label is a key value pair, where value is static but has a meaning subject to change based on time and context.

5. The system of claim 4, wherein the codified infrastructure with the dynamically labeled resource is configured to provide pre-deployment configuration of a post-deployment action.

6. The system of claim 1, further comprising the manager configured to facilitate authorship of the codified infrastructure, including convert the codified infrastructure to a feature vector, discover one or more functional characteristics defined in the codified infrastructure subject to completion, and automatically complete authorship of the codified infrastructure with a similarly classified feature vector characteristic.

7. The system of claim 6, wherein authorship facilitation of the codified infrastructure includes return of a list of one or more similar and current codified infrastructures, a segment of a similar codified infrastructure, suggested codified infrastructure syntax, or any combination thereof.

8. A computer program product to interpret and manage an executable codified infrastructure, the computer program product comprising:
    a computer readable storage medium having program code embodied therewith, the program code executable by a processor to:
        receive the executable codified infrastructure, the codified infrastructure including a dynamically labeled resource, wherein a meaning of the dynamically labeled resource changes depending on time and context;
        construe the dynamically labeled resource;
        selectively convert a dynamic label of the construed dynamically labeled resource in the codified infrastructure into a static label, and generate a statically labeled codified infrastructure;
        construct and deploy an architecture described in the statically labeled codified infrastructure; and selectively and dynamically update the deployed architecture responsive to a detected change of a provisioned resource.

9. The computer program product of claim 8, further comprising program code executable by the processor to detect the change in the meaning of the dynamically labeled resource, wherein the dynamic update maintains the codified infrastructure in accordance with the meaning change.

10. The computer program product of claim 8, further comprising program code executable by the processor to construe the dynamically labeled resource, including check an external resource corresponding to the label and identify a value of the external resource.

11. The computer program product of claim 8, wherein the dynamic label is a key value pair, where content of the key value is static but has a meaning subject to change based on time and context.

12. The computer program product of claim 11, wherein the codified infrastructure with the dynamically labeled resource is configured to provide pre-deployment configuration of a post-deployment action.

13. The computer program product of claim 8, further comprising program code executable by the processor to facilitate authorship of the codified infrastructure, including convert the codified infrastructure to a feature vector, discover one or more functional characteristics defined in the codified infrastructure subject to completion, and automatically complete authorship of the codified infrastructure with a similarly classified feature vector characteristic.

14. The computer program product of claim 13, wherein program code executable by the processor to facilitate authorship of the codified infrastructure includes return of at least one of a list of one or more similar and current codified infrastructures, a segment of a similar codified infrastructure, suggested codified infrastructure syntax, or any combination thereof.

15. A method comprising:
    receiving an executable codified infrastructure, the codified infrastructure including a dynamically labeled resource, wherein a meaning of the dynamically labeled resource changes depending on time and context;
    construing the dynamically labeled resource;
    selectively converting a dynamic label of the construed dynamically labeled resource in the codified infrastructure into a static label;
    generating a statically labeled codified infrastructure;
    deploying an architecture described in the statically labeled codified infrastructure; and
    selectively and dynamically updating the deployed architecture responsive to a detected change of a provisioned resource.

16. The method of claim 15, further comprising detecting the change in the meaning of the dynamically labeled resource, wherein the dynamic updating maintains the codified infrastructure in accordance with the meaning change.

17. The method of claim 15, wherein the dynamic label is a key value pair, where content of the key value is static but has a meaning subject to change based on time and context.

18. The method of claim 15, further comprising construing the dynamically labeled resource, including checking an external resource corresponding to the dynamic label and identifying a value of the external resource.

19. The method of claim 15, wherein receiving the executable codified infrastructure further comprises assisting with authorship of the codified infrastructure, including converting the codified infrastructure to a feature vector, discovering one or more functional characteristics defined in the infrastructure subject to completion, and automatically completing authorship of the infrastructure with a similarly classified feature vector characteristic.

20. The method of claim 19, wherein completing authorship of the codified infrastructure includes returning at least one of a list of one or more similar and current codified infrastructures, a segment of a similar codified infrastructure, suggested codified infrastructure syntax, or any combination thereof.

\* \* \* \* \*